(12) United States Patent
Hua

(10) Patent No.: US 7,628,844 B2
(45) Date of Patent: Dec. 8, 2009

(54) FILTRATION MEDIA FOR THE REMOVAL OF MERCURY FROM FLUE GAS EMISSIONS

(75) Inventor: Duen-Wu Hua, Edgewood, MD (US)

(73) Assignee: J.M. Huber Corporation, Edison, NJ (US)

( * ) Notice: Subject to any disclaimer, the term of this patent is extended or adjusted under 35 U.S.C. 154(b) by 229 days.

(21) Appl. No.: 11/874,132

(22) Filed: Oct. 17, 2007

(65) Prior Publication Data

US 2009/0101015 A1 Apr. 23, 2009

(51) Int. Cl.
*B01J 20/10* (2006.01)
*B01J 20/30* (2006.01)

(52) U.S. Cl. .......................... 95/134; 96/153; 423/338; 502/407

(58) Field of Classification Search .............. 96/108, 96/153; 95/134, 107, 900; 423/210, 338, 423/339, 511; 502/407, 411; 110/203, 345
See application file for complete search history.

(56) References Cited

U.S. PATENT DOCUMENTS

| | | | |
|---|---|---|---|
| 5,080,799 A | 1/1992 | Yan | |
| 5,108,595 A * | 4/1992 | Kirkland et al. | 210/198.2 |
| 5,364,455 A * | 11/1994 | Komarneni et al. | 95/117 |
| 5,968,652 A * | 10/1999 | Hanggi et al. | 428/405 |
| 6,090,880 A | 7/2000 | Zimmer et al. | |
| 6,174,926 B1 * | 1/2001 | Menon et al. | 516/100 |
| 6,719,828 B1 | 4/2004 | Lovell et al. | |
| 7,048,781 B1 | 5/2006 | Lovell et al. | |
| 7,070,749 B2 * | 7/2006 | Lindner et al. | 423/339 |
| 7,081,434 B2 | 7/2006 | Sinha | |
| 2005/0207955 A1 * | 9/2005 | Wang | 423/210 |
| 2005/0241483 A1 * | 11/2005 | Okada et al. | 96/134 |
| 2006/0011115 A1 | 1/2006 | Breen et al. | |
| 2007/0003762 A1 | 1/2007 | Witham et al. | |
| 2007/0119300 A1 | 5/2007 | Yang et al. | |
| 2007/0122327 A1 | 5/2007 | Yang et al. | |
| 2007/0122619 A1 | 5/2007 | Yang et al. | |
| 2007/0286788 A1 * | 12/2007 | Panz et al. | 423/335 |

* cited by examiner

*Primary Examiner*—Frank M Lawrence
(74) *Attorney, Agent, or Firm*—Cheryl J. Tubach; Patricia L. Ades

(57) ABSTRACT

Filtration materials comprising heat-treated metal-doped precipitated silica or silica gel materials with sulfur-containing functional silane surface treatments are provided. Such materials exhibit excellent mercury removal properties from flue gas emissions through the trapping of mercury vapors within a smokestack (or other like site). The metal dopant and the sulfur-containing functional silane components applied to the surface of the target metal-doped gels effectuate the desired mercury reactions to permit capture thereof. In combination, such components permit versatile utilization in either a fixed bed configuration or through a dynamic mercury removal procedure. Methods of using and specific filter apparatuses are also encompassed within this invention.

8 Claims, No Drawings

FILTRATION MEDIA FOR THE REMOVAL OF MERCURY FROM FLUE GAS EMISSIONS

FIELD OF THE INVENTION

The present invention relates generally to filtration materials comprising heat-treated metal-doped precipitated silica or silica gel materials with sulfur-containing functional silane surface treatments. Such materials exhibit excellent mercury removal properties from flue gas emissions through the trapping of mercury vapors within a smokestack (or other like site). The metal dopant and the sulfur-containing functional silane components applied to the surface of the target metal-doped gels effectuate the desired mercury reactions to permit capture thereof. In combination, such components permit versatile utilization in either a fixed bed configuration or through a dynamic mercury removal procedure. Methods of using and filter apparatuses are also encompassed within this invention.

BACKGROUND OF THE INVENTION

Fossil fuels have long been burned for the production of energy throughout the world. Unfortunately, such sources of energy (such as coal, lignite, fuel oil, peat, and other like materials) also invariably include many unwanted pollutants that are easily emitted therefrom during such a process. Included within this list of pollutants is mercury, a compound that has been known to cause a plethora of defects in animals. It has been a need within the fossil fuel industry to provide a cleaner manner of generating energy by reducing such emissions of pollutants, significantly mercury, from entering the atmosphere. Such a process is extremely difficult to achieve, for a number of reasons, without incurring large expenses. For instance, mercury removal may be provided through initial purification of the fossil fuel itself; however, such an alternative is nearly impossible to accomplish without impacting the energy source during such a step. Furthermore, completely capturing all emissions for further utilization is not possible due to the sheer volume of gases generated, the extreme heat exhibited by such emissions, and the lack of utility of the vast majority of such emissions in general. As such, the production of such fossil fuel emissions has been tempered through an allowance of a certain amount of pollutants within the atmosphere, coupled with the drive to reduce such emissions over time.

Furthermore, the most popular emissions reduction materials, being carbon-based, are very difficult to dispose of effectively. The resultant fly ash from a fossil fuel-burning smokestack (for example) will contain many different unwanted pollutants that are not permitted in many landfills and like locations. As such, recycling of such fly ash residue in end-use products deemed acceptable from a captured-pollutant perspective is a desirable outcome. With carbon-based filter media, however, such a result is not easy to accomplish. The ability to incorporate a carbon-based pollutant removal material in concrete is very troublesome as such a filter medium material is not compatible for stability purposes within such a product. Hence, there remains a need to develop a non-carbon-based filter medium that exhibits the desired ability to permit recycling of such materials.

Various possibilities have been provided within the fossil fuel emission reduction industry recently to that end. Currently, the most commonly used method for mercury reduction is ACI (activated carbon injection) into the flue stream of coal-fired power plant. Ample examples of ACI use and issues are known. Coal-fired combustion flue gas streams are of particular concern because their composition includes trace amounts of acid gases, including $SO_2$ and $SO_3$, NO and $NO_2$, and HCl, flue gas components that have deleterious effect on activated carbons. Powdered activated carbon has shown effectiveness as part of a $Hg^{+2}$ capture mechanism; unfortunately, this ionic species is not the only mercury type present within typical flue gases. Such a removal product is not as effective for the more prevalent elemental mercury pollutant. There have been efforts to enhance the $Hg^0$ trapping efficiency of powdered activated carbon by incorporating bromines therein; however, the environmental impact of such components is still debated, not to mention the higher costs associated with fly ash reuse make this approach suspect to the degree that a more desirable alternative is needed.

Alternatives for powder activated carbon were attempted at times but usually failed to remove mercury as efficiently. Of greatest note are U.S. Pat. Nos. 6,719,828 and 7,048,781, dedicated to metal sulfide moieties attached to ion-exchange sites on impregnated silicates. The '828 patent describes a preparation of layered sorbents such as clays with metal sulfide between the clay layers and methods for their preparation. The method used to prepare the layered sorbents is based on an ion exchange process, which limits the selection of substrates to only those having high ion exchange capacity. In addition, ion exchange is time-consuming and involves several wet process steps, which significantly impairs the reproducibility, performance, scalability, equipment requirements, and cost of the sorbent. The '781 patent describes phyllosilicate substrates (most notably, vermiculite and montmorillonite), and require an initial metal treatment to create such ion-exchange locations thereon the surface. From there, a polyvalent metal sulfide is produced through an ion-exchange process on the surface, thus permitting the sulfide moiety to be present at a location wherein reaction with a fixed-bed filtration medium including such a material will result in capture of mercury ions with the sulfide moieties. Such compounds appear to be successful for their intended purpose; however, there is complexity involved in the ion-exchange mechanism that makes production of such materials relatively difficult to accomplish and suspect in reliability as a result.

There is thus a need for the provision of a simpler method to provide an effective non-carbon-based mercury flue gas emission removal material for the fossil fuel industry. This invention has been determined to fill this void.

BRIEF DESCRIPTION OF THE INVENTION

It has been realized that certain precipitated silica and/or silica gel-based compositions make excellent gas filter media. However, little has been provided within the pertinent prior art that concerns the ability to provide effective mercury removal capabilities utilizing such materials. It has now been realized that the combination of an initial metal doping step, followed by a subsequent treatment thereof with a sulfur-containing silane material to the metal-doped locations provides an excellent, ultimate compound that exhibits the desired high mercury removal levels, particularly upon further heat treatment thereof.

Accordingly, one potential embodiment of this invention is a metal-doped silica product (being either a silica gel or precipitated silica or a combination of both) including a sulfur-containing silane attached to both the metal species and silica portions thereof. The silica product may be silica gels or precipitated silicas, but preferably exhibit a BET surface area of larger than 100 $m^2/g$, a pore volume larger than 0.18 cc/g as measured by nitrogen porosimetry, and wherein the metal doped on and within said silicon-based gel materials is present in an amount of from 1 to 12% by weight of the total amount of the silica gels. Preferably, the metal-doped products are silica gels exhibiting a large surface area and open pore structure and wherein said metal is present in an amount of from about 0.1 to 10% by weight of the entire metal-doped silica material, preferably from 0.1 to 5%. The large surface area and open pore structure is necessary to provide effective mercury removal. If the surface area is insufficient in size, the mercury will not bind properly with the metal and sulfur moieties present on the surface thereof. If the metal and/or sulfur is present within the pores, and such pores cannot further permit retention of large elemental mercury compounds, effective mercury removal will not be forthcoming either. Thus, whether the substrate is precipitated silica or silica gel in nature, the aforementioned large surface area and pore size requirements are beneficial for proper functioning as a mercury removal filter medium.

Preferably, the metal is a polyvalent metal as well, such as, preferably, though not necessarily, copper. The sulfur-containing silane may be any type that meets such a broad description (and includes at least one sulfur group per molecule, preferably at least two, and most preferably at least four, and the silane exhibits excellent adhesive affinity for a precipitated silica and/or silica gel surface), though the preferred, but not required, types are sulfur containing silanes, such as, again, without limitation, bis-(triethoxy-silylpropyl) tetrasulfide, a sulfur-functional silane with four sulfur-containing groups attached. Such a reactant group provides sufficient sites for the silane to react with the metal moieties, and a large number of sulfur sites for effective reaction, and reliable capture, of mercury. The metal dopant may actually be an optional component, as the precipitated silica and/or silica gel may effectively bond with the sulfur-containing functional silane itself; however, it is preferred, again for reliability purposes, for the metal species to be initially doped on the target silica gel surface.

According to another aspect of the invention, a multivalent metal-doped silica gel having a silane moiety present thereon with at least two sulfur groups is provided, wherein said gel exhibits a mercury removal level of 14 mg/g upon utilization in a fixed bed filter (cylindrical tube) of at least 1 cm in depth and 0.8 cm internal diameter, with a small amount of inert material present therewith (such as sand, as one non-limiting example). Such a filter medium will permit mercury removal by a dynamic process as well (i.e., one in which the filter medium is dispersed before the fly ash collection device, such as an ESP—electrostatic precipitator, rather than in a prefabricated filter). In such an instance, the filter medium must be able to contact the mercury emissions throughout the smokestack, then settle to a surface therein for recapture at a later time. Although such a process is rather difficult to accomplish, it is still the desired manner of emission reduction as a fixed bed filter medium adds complexity in placement, removal, high temperature exposure, shutdown of the production line for servicing, etc.

According to still another aspect of the invention, a method of producing such metal-doped silica gel materials having a sulfur-containing silane treatment applied thereto is provided, said method comprising the sequential steps of:
  a) providing a silica material selected the group consisting of a precipitated silica, a silica gel, or a combination of both;
  b) wet reacting said silica material with at least one multivalent metal salt to produce metal-doped silica material;
  c) drying and milling said metal-doped silica material to a desired particle size;
  d) introducing an amount of sulfur-containing silane materials to the dried and milled metal-doped silica materials of step "c" to produce resultant sulfur-containing silane-treated metal-doped silica materials; and
  e) heating the resultant materials of step "d" at a temperature of at least 140° C. for an amount of time to effectuate a color change from the resultant materials of step "d" (i.e., for at least 30 minutes, preferably at least 1 hour, more preferably at least 2 hours).

Alternatively, step "a" may include a production step for generating said precipitated silica and/or silica gel materials.

One distinct advantage of this invention is the provision of a filter medium that exhibits highly effective mercury removal when present in a relatively low amount and under a temperature typical of a cold-side fossil fuel emissions generator. Among other advantages of this invention is the ability to utilize the resultant mercury-reacted materials in a recycling process and end-use product, such as within concrete fly ash.

DETAILED DESCRIPTION OF THE INVENTION

For purposes of this invention, the term "silica gel" is intended to encompass materials that are formed from the reaction of a metal silicate (such as sodium silicate) with an acid (such as sulfuric acid) and permitted to age properly to form a gel material or materials that are available from a natural source (such as from rice hulls) and exhibit pore structures that are similar to such gels as formed by the process above. Such synthetic materials may be categorized as either silicic acid or polysilicic acid types or silica gel types, whereas the natural source materials are typically harvested in a certain form and treated to ultimately form the final gel-like product (such a method is provided within U.S. Pat. No. 6,638,354). The difference between the two synthetic categories lies strictly within the measured resultant pH level of the gel after reaction, formation and aging. In any event, as noted above, the term "silica gel" is intended to encompass both of these types of gel materials. While not wishing to be held by theory, it is believed that the doping of the silica gel with metal (such as copper) is facilitated by the presence of suitably sized pores and a simultaneously large surface area within the silica gels themselves. The metal can thus be applied to a number of different sites on the silica gel surface. Subsequently, after the doped silica gel (or, as noted supra, precipitated silica of similarly sized pores and surface area) is produced, the resultant doped composite is then dried and milled to a suitable particle size to permit desired packing within a fixed bed filter apparatus, or for proper discharge within an ESP, ultimately. Such a milling step needs to be undertaken at this stage as once the further treatment has been performed, milling may be difficult to accomplish. The desired range of median particle size for these materials (assuming similar density) is from 10 to 60 microns, with about 20 microns preferred.

After such a particle size has been attained for the base materials, the metal-doped silica gel (or precipitated silica) particles (a/k/a materials) are then treated with the aforementioned sulfur-containing silane. The silane portion of this reactant is necessary to effectuate proper adhesion thereof to the silica gel or precipitated silica surface (and thus must exhibit an affinity for such surface adhesion). In this manner, the sulfur groups may be linked to the base silica gel and/or precipitated silica surface via the silane. It is further believed, without intending on relying on any specific scientific theory, that the sulfur groups may at least partially react with the metal dopant on the silica surface as well, thereby not only permitting effective adhesion to such a surface in such a manner, but also creating a further excellent source of reactive groups for mercury capture. In any event, it is this combination of metal with sulfur that effectuates the necessary mercury removal capability of the inventive filter medium. Without the metal, there is little mercury removal capacity; with the metal alone, at least there is some increase over the silica alone. The selection of the metal is also important, as copper appears to exhibit much better results than other types of transition metals (such as zinc and iron). Thus, although it is not the only possible metal to be used, copper appears to be the most preferred. Also, the pH of the ultimate materials is very important to generate a proper mercury removal filter medium therewith. Any pH lower than 7.0 (and thus acidic in nature), is required to provide the desired mercury removal capability. If the pH is too high, the mercury removal capacity thereof is compromised to too large an extent and is unworkable.

The general method of producing the preferred silica gel base material of this invention is as follows:

1. Making a silicic acid sol by Alkali metal silicate addition to a mineral acid to a target pH values of between 1.5 and 4.0 to form a quasi-stable sol. (pH control in this stage is critical as it is this reaction pH that dictates the pore size distribution in the final product)

2. Quenching the sol in a hot water medium to solidify the silicic acid sol into the more stable polysilicic acid gel by using temperature and pH control in the subsequent tank.

The hot water medium essentially provides the multiple functions of i. Speeding up the gel process as a result of the increased temperature, ii. Diluting the salt present in the sol thereby requiring less washing less washing, iii. Having the gel form into discrete individual agglomerates which allowed for the migration of salt across a shorter distance thereby speeding up wash time;

3. Optionally introducing a caustic in the form of an alkali metal hydroxide or alkaline earth metal hydroxide, 4. Aging the gel in salt water, 5. Washing the gel with press filter to rid the excess salt, 6. Drying the pressed cake, and 7. Optionally milling the dried gel.

Such a process avoids silica gelation in the reactor, instead gelling the silica in the filter feed tank, thus enabling the gel to be made using common precipitation reactors. The transfer of the polysilicic acid solution into the filter feed tank can be varied, either through the utilization of pumps or reliance on gravity.

The inventive silica gels herein described may be produced within any type of silica manufacturing equipment as long as the aforementioned necessary process steps are followed. Typically, the inventive silica gel is prepared by mixing an aqueous alkali metal silicate solution, usually sodium silicate, and an aqueous mineral acid solution, usually sulfuric acid, to form a silica hydrosol and allowing the hydrosol to set to a hydrogel. The concentration of the acid solution is generally from about 5 to about 70 percent by weight and the aqueous silicate solution commonly has an $SiO_2$ content of about 6 to about 25 weight percent and a weight ratio of $SiO_2$ to $Na_2O$ of from about 1:1 to about 3.4:1. The reaction is generally carried out at temperatures of from about 15 to about 80° C. and typically is carried out at an ambient temperature (i.e., from about 20 to 25° C. at about 1 atmosphere pressure).

The relative proportions and concentrations of the reactants are selected so that the hydrosol contains from about 5 to about 20 weight percent $SiO_2$ and has a pH of from about 1 to about 11. When the quantity of acid reacted with the silicate is such that the final pH of the reaction mixture is acidic, typically from about 1 to 5, the resulting product is considered an acid-set hydrogel. The hydrogel granules are then washed with water or acidified water to remove residual alkali metal salts which are formed in the reaction. Acidified water usually has a pH of from about 1.0 to about 5.0, preferably from about 2.5 to about 4.5. The acid may be a mineral acid such as sulfuric acid, hydrochloric acid, nitric acid, or phosphoric acid or a weaker acid such as formic acid, acetic acid, oxalic acid, citric acid, tartric acid, nitriloacetic acid, ethylene diamine-tetraacetic acid, or propionic acid. The water usually has a temperature of from about 80 to about 200° F. (27-93° C.), preferably about 90° C.). Generally, the hydrogel is washed for a period of from about 0.5 to about 8 hours.

The resulting gel in the filter feed tank is aged for a time of from 0.5 to 4 hours, at a temperature of from 65 to 100° C., and, depending on the resultant silica gel desired, at a pH level of either acidic (less than 6.5) or basic (above 7.0). After aging, the resultant gel is then reslurried and filtered via a press filter for washing and filtering. The pressed cake can be dried by any conventional means such as oven drying, tray drying, flash drying, or spray drying and ground in a fluid energy mill, hammer mill, or other known mill to the desired particle size. Generally, the ground gels have a weight median particle diameter of from about 1 to about 40 microns.

The resultant gels can be collected prior to washing and filtering and then introduced, as a polysilicic acid gel liquid, into a sample of calcium hydroxide, lime, magnesium hydroxide, and the like, to permit reaction to form a composite gel. The reaction may be at a temperature of from 65 to 100° C., for a time of from 0.5 to 4 hrs. Subsequently, the resultant product is washed for excess salt, as above, dried, as above, collected and possibly milled as well, to provide a finished composite gel material in powder, granulate, or other like form. Subsequently, the resultant product is washed for excess salt, as above, dried, as above, collected and possibly milled as well, to provide a finished composite gel material in powder, granulate, or other like form.

Silica gels made by this process typically will have BET surface areas of 350-1000 $m^2/g$ with pore diameter of 17 Å-45 Å. In experiments where the reaction pH is maintained at below 1.75 before the quenching stage the pores were found to be predominantly if not completely micropore in size (<20 Å). In other experiments where the drop pH was maintained between 3 and 4.0 the final product was predominantly mesoporous (20 Å and 45 Å). As for the caustic gels, as well as the composite gels, the pore sizes ranged from about 60 to 200 Å.

Metal-doped precipitated silica may be produced by reacting an alkali metal silicate and a mineral acid in an aqueous medium. When the quantity of acid reacted with the silicate is such that the final pH of the reaction mixture is alkaline, the resulting product is considered to be precipitated silica. Sulfuric acid is the most commonly used acid, although other mineral acids such as hydrochloric acid, nitric acid, or phosphoric acid may be used. Sodium or potassium silicate may be used, for example, as the alkali metal silicate. Sodium silicate is preferred because it is the least expensive and most readily available. The concentration of the aqueous acidic solution is generally from about 5 to about 70 percent by weight and the aqueous silicate solution commonly has an $SiO_2$ content of about 6 to about 25 weight percent and a molar ratio of $SiO_2$ to $Na_2O$ of from about 1:1 to about 3.4:1.

The mineral acid is added to the metal silicate solution to form precipitated silica. Alternatively, a portion of the metal silicate is first added to a reactor to serve as the reaction medium and then the remaining metal silicate and the mineral acid are added simultaneously to the medium. Generally, continuous processing can be employed and mineral acid is metered separately into a high speed mixer. The reaction may be carried out at any convenient temperature, for example, from about 15 to about 100° C. and is generally carried out at temperatures between 60 and 90° C.

The silica will generally precipitate directly from the admixture of the reactants and is then washed with water or an aqueous acidic solution to remove residual alkali metal salts which are formed in the reaction. For example, when sulfuric acid and sodium silicate are used as the reactants, sodium sulfate is entrapped in the precipitated silica wet mass. Prior to washing, the mass may be further adjusted with additional mineral acid as is necessary to achieve the desired final pH. The mass may be washed with an aqueous solution of mineral acid such as sulfuric acid, hydrochloric acid, nitric acid, or phosphoric acid or a medium strength acid such as formic acid, acetic acid, or propionic acid.

Generally, the temperature of the wash medium is from about 27° C. to about 93° C. Preferably, the wash water is at a temperature of from about 50° C. to about 93° C. The silica wet mass is washed for a period sufficient to reduce the total salts content to less than about 5 weight percent. The mass may have, for example, a $Na_2O$ content of from about 0.05 to about 3 weight percent and a $SO_4$ content of from about 0.05 to about 3 weight percent, based on the dry weight of the precipitated silica. The period of time necessary to achieve this salt removal varies with the flow rate of the wash medium and the configuration of the washing apparatus. Generally, the period of time necessary to achieve the desired salt removal is from about 0.05 to about 3 hours. Thus, it is preferred that the precipitated silica mass be washed with water at a temperature of from about 50° C. to about 93° C. for about 0.05 to about 3 hours. In one potential embodiment, the washing may be limited in order to permit a certain amount of salt (such as sodium sulfate), to be present on the surface and within the pores of the silica material. Such salt is believed, without intending on being limited to any specific scientific theory, to contribute a level of hydration that may be utilized for the subsequent metal doping procedure to effectively occur.

In order to prepare hydrous precipitated silicas suitable for use in the filter media of this invention, the final silica pH upon completion of washing as measured in 5 weight percent aqueous slurry of the silica, may range from about 6 to about 8.

The washed precipitated silica mass generally has a water content, as measured by oven drying at 105° C. for about 16 hours, of from 10 to about 60 weight percent and a particle size ranging from about 1 micron to about 50 millimeters. Alternatively the precipitated silica is then dewatered to a desired water content of from about 20 to about 90 weight percent, preferably from about 50 to about 85 weight percent. Any known dewatering method may be employed to reduce the amount of water therein or conversely increase the solids content thereof. For example, the washed precipitated silica mass may be dewatered in a filter, rotary dryer, spray dryer, tunnel dryer, flash dryer, nozzle dryer, fluid bed dryer, cascade dryer, and the like.

The hydrous silica gel and/or precipitated silica product preferably remains in a wet state (although drying and grinding may be undertaken, either separately or simultaneously; preferably, though, the materials remain in a high water-content state for further reaction with the metal dopant) for subsequent doping with a multivalent metal salt. The metals that can be utilized for such a purpose include, as alluded to above, any multivalent metal, such as, without limitation, cobalt, iron, manganese, zinc, aluminum, chromium, copper, tin, antimony, indium, tungsten, silver, gold, platinum, mercury, palladium, cadmium, nickel, and any combinations thereof. For cost and performance reasons, copper is potentially preferred. The listing above indicates the metals possible for production during the doping step within the pores of the subject precipitated silica materials. The metal salt is preferably water-soluble in nature and facilitates dissociation of the metal from the anion when reacted with silica-based materials. Thus, sulfates, chlorides, bromides, iodides, nitrates, and the like, are possible as anions, with sulfate, and thus copper sulfate, most preferred as the metal doping salt (cupric chloride is also potentially preferred as a specific compound; however, the corrosive nature of such a compound may mitigate against use on industrial levels). Without intending on being bound to any specific scientific theory, it is believed that copper sulfate enables doping of copper [as a copper (II) species] in some form to the precipitated silica structure. The wet state doping procedure has proven to be critical for the provision of certain desired filter efficiency results.

The ultimate particle sizes of the multivalent-metal impregnated (doped) silica materials are dependent upon the desired manner of providing the filter medium made therefrom. The important issue, however, is not just the particle sizes in general, but also the degree of homogeneous metal doping effectuated within the pores of the subject silicas themselves.

Without intending on being bound to any specific scientific theory, it is believed that the wet state doping permits incorporation of sufficient chemical species within the pores of the silica materials to permit sufficient points for reaction of the target toxic chemicals. In a wet state, the pores of the subject silica product are large enough in volume to allow for a metal salt or chemical moiety to enter therein.

Furthermore, to the surface of the metal-doped silica materials must be reacted with a sulfur-containing silane compound. Without crowding the substrate pore accessibilities, the higher the number of sulfur groups, the more effective the mercury removal capability of the inventive materials. Thus, at least one group per reactant compound should be employed. Preferably, this number is at least four per compound. Also, the silane should exhibit an affinity for the metal dopant on the silica gel and within the pores thereof. The presence of metal dopant within the pores of the target silica gels helps to provide effective bonding and potential removal of the target mercury as well as other compounds, too. However, it is believed that the combination of the copper and sulfur moieties will provide the greatest mercury removal capabilities of the filter medium. As noted above, the potentially preferred, but not required, compound fitting this description is bis-(triethoxy-silylpropyl) tetrasulfide. Such a compound will react readily with the metal doped silica gel, and thus provide a large amount of sulfur groups for mercury capture (four, in total, per reactant compound). The amount of silane reacted with the metal-doped silica product could be as high as 36 wt % by dried metal-doped silica product, lower dosage would work as long as there are enough copper and sulfur groups present to react with the targeted mercury pollutants.

The inventive silica product particles thus have been doped (impregnated) with at least one multivalent metal salt (such as, as one non-limiting example, copper sulfate) in an amount of from about 1 to 12 wt %, expressed as the percentage weight of base metals, such as copper, of the entire dry weight of the metal-impregnated (doped) silicon gel-based particles.

From there, the metal-doped compounds are reacted with at most 36% by weight of the silane.

Of great importance is the further heat-treatment of the resultant silane-treated metal-doped silica product particles. Such a heat treatment (of at least 140° C. for at least 30 minutes, preferably at least 1 hour, most preferably at least 2 hours) will cause a substantial color change in the product (from a light blue or green to a dark brown). Without intending on being bound by any specific scientific theory, it is believed that this resultant color change causes a change in the form of the metal and sulfur products present on the surface of the silica product particles, particularly if such moieties have reacted with one another prior to such heat treatment. It has thus been surprisingly determined that such a heat treatment (which may be accomplished through the utilization of an oven alone, or through the initial introduction of such particles within the test apparatus for mercury removal permits the final step in producing a highly effective elemental mercury removal filter medium. Such resultant heat-treated sulfur-containing silane-treated metal-doped silica product particles thus provide a filter medium that exhibits a mercury removal of about 14 mg/g, at 140° C. when applied to a filter bed of at most 1 cm height within a cylindrical tube of 1.27 cm in outer diameter. The inventive metal-doped, etc., silica product particles could be employed directly or incorporated into a filter media in any amount in order to target the amount of mercury removal desired.

In a fixed bed configuration, the filter medium of the invention can also further contain as optional ingredients, silicates, clays, talcs, aluminas, carbons, and polymers. These are conventional components of filter media, and materials suitable for this purpose need not be enumerated for they are well known to those skilled in the art. Furthermore, such inventive silane-treated metal-doped silica precipitated silicas and/or silica gels of the invention may also be introduced within a polymer composition (through impregnation, or through extrusion) to provide a polymeric film, composite, or other type of polymeric solid for utilization as a filter medium. Additionally, a nonwoven fabric may be impregnated, coated, or otherwise treated with such invention materials, or individual yarns or filaments may be extruded with such materials and formed into a nonwoven, woven, or knit web, all to provide a filter medium base as well. Such films and/or fabrics, as noted above, may include discrete areas of filter medium, or the same type of interspersed materials (carbon black mixed on the surface, or co-extruded, as merely examples, within the same fabric or film) as well.

The fixed bed filter system utilized for testing of the viability of the medium typically contains a media bed thickness of from about 1 cm to about 3 cm thickness, preferably about 1 cm to about 2 cm thickness within a cylindrical tube of 1.27 cm in diameter. Without limitation, typical filters that may actually include such a filter medium, will comprise greater thicknesses (and thus amounts) of such a filter medium—for industrial uses. These limited filter medium measurements are only intended to be rough approximations for such end use applications with regard to initially testing the capabilities of the inventive filter media for mercury removal; in actual utility situations, any thickness, diameter, width, height, etc., of the bed and/or the container may be utilized. The protocol and experimental setup is designed to simulate the length of time the filter may be in use and the potential for fossil fuel emissions. The amount of filter medium that may be introduced within a filter system in any amount, as long as the container is structurally sufficient to hold the filter medium therein and permits proper airflow in order for the filter medium to properly contact the target emissions.

For a dynamic mercury removal process [i.e., the filter medium is discharged within the target gas emission site (again, such as, without limitation, a smokestack) directly without any specific configuration followed], the particles are generally provided as the only filter medium component.

It is important to note that although mercury is the test subject for removal by the inventive filter media discussed herein, such media may also be effective in removing other pollutants from fossil fuel emissions as well, including heavy metals such as gold, silver, cadmium, and the like.

PREFERRED EMBODIMENTS OF THE INVENTION

Copper content was determined utilizing an ICP-OES model Optima 3000 available from PerkinElmer Corporation, Shelton, Conn.

The level of metal impregnate is expressed on a % elemental basis. A sample impregnated with about 5 wt % of copper exhibits a level of copper sulfate so that the percent Cu added to the silicon-based gel is about 5 wt % of Cu/adsorbent Wt. In the case of cupric sulfate pentahydrate ($CuSO_4 5H_2O$), 100 gram of dried silica gel would be impregnated by 25 grams of copper salt.

Silane treatment was performed utilizing bis-(triethoxysilylpropyl) tetrasulfide (although any other silane including at least one sulfur group may be utilized as well), the amount targeted was 36 wt % by dried copper doped silica gel and/or precipitated silica. In the case of tetra-sulfur silane, 100 grams of the dried copper doped silica gel would be sprayed with 36 grams of the silane (the resultant sulfur content being about 24 wt %) in a Henschel mixer, preferably. Subsequently, the silane-treated, copper-doped silica particles (gel or precipitate) were dried to remove all ethanol, if present. The treated sample was further heated for better copper, silane, and silica bonding. The resultant particles were then equilibrated under test conditions (140° C.), and thus heat-treated, for two hours prior to undertaking any mercury removal analysis.

Materials Production

Inventive Example 1

900 liters of water were added to a 150 gallon reactor. 11.4% sulfuric acid was then introduced to the same reactor to adjust the pH to 4 and the solution was then heated to 90° C. The resultant aqueous solution was then dropped into a large filter feed tank. In the same 150 gallon reactor as above, 150 liters of room temperature sulfuric (11.4 wt %) acid was then added under agitation enough to stir with minimal splashing. Sodium silicate (3.3 molar ratio, 24.7 wt %) was then added thereto at room temperature in two stages. The first stage, being at a rate of 3.0 liters/min until the resultant pH was close to 2.5. Thereafter, the second stage silicate addition was run at a rate of 1.5 liters/min until a pH of about 2.85 was reached, at which time silicate addition was stopped. The pH level was then manually adjusted pH to 3.00. The resultant reactor batch was then pumped into the large filter feed tank, while maintaining the temperature at about 90° C. under no agitation for a total of 35 minutes. The resultant gel slurry was then washed and filtered with a filter press (EIMCO), until the filtrate conductivity was measured below 5000 μmho. After a 12-minute air purge, the resultant gel wet cake was oven dried (105° C.) and the resultant gel solids was measured to be about 15%.

The resulting gel wet cake was then mixed with copper sulfate pentahydrate. The amount copper sulfate pentahydrate added is calculated as to have 5% copper in the final dried copper doped acid gel (the copper sulfate to dry silica weight ratio was 1 to 4, i.e. 25 g of copper sulfate pentahydrate on 100 g $SiO_2$). The copper-doped wet acid gel was then dried in an oven at 105° C. The dried copper-doped acid gel was screened to mean particle size larger than 40 mesh.

This dried copper-doped acid gel product was then surface treated with sulfur-functionalized silane, bis-(triethoxy-silylpropyl) tetrasulfide, using ethanol as the solvent, and dried (at 110° C.). The weight ratio of the reactants was 5.5 g silane to 10 g of dried gel. The treated sample was then heated at 140° C. for 2 hours before Hg removal testing was commenced.

Inventive Example 2

The same method was followed as in Inventive Example 1 except that after the two silicate additions were performed, the resultant reactor batch was pumped into the filter feed tank and held at no agitation for 22 minutes, followed by 1 minute of agitation at 500 rpm, followed by a second non-agitation period of another 22 minutes, and a second 1-minute agitation at the same speed. The resultant gel was then washed and filtered until a filtrate conductivity below 3000 μmho was measured. The remaining wet cake was then air purged to 10 minutes and the cake solids were about 15%.

As in Inventive Example 1, the resulting gel wet cake was mixed with copper sulfate pentahydrate in the same manner and the wet materials were dried in an oven at 105° C. The dried copper-doped acid gel was pulverized to a mean particle size of about 50 micron.

Again, as in Inventive Example 1, surface treatment of the dried gel was performed doping it with sulfur-functionalized silane, bis-(triethoxy-silylpropyl) tetrasulfide, using a jacketed Henschel mixer, at 190° F. The weight ratio was 3.6 g silane on 10 gram of dried copper doped acid gel. The treated sample was then heated at 140° C. for several hours before Hg removal testing.

Inventive Example 3

1020 cc of water were added to a 1 gallon stainless vessel, to which 2 cc of 10% NaOH solution were then added, and the resultant solution was then heated to 90° C. In a 1.5 liter reactor, 153.2 cc of room temperature sulfuric (11.4 wt %) acid were then introduced under sufficient agitation to stir with minimal splashing (~120 RPM). Sodium silicate (3.3 molar ratio, 24.7 wt %) was then added thereto at room temperature in two stages. The first stage, being at a rate of 11.4 cc/min until the resultant pH was close to 2.5. After 10 minutes, the agitation level was raised to 250 rpm with a gradual increase to 300 rpm over a period of five minutes. Thereafter, the second stage silicate addition was run at a rate of 0.5 cc/min until a pH of about 2.85 was reached, at which time silicate addition was stopped. The pH level was then manually adjusted pH to 3.00. This reactor batch was then transferred into a 1-gallon vessel containing hot water with the temperature maintained at about 90° C. for 45 minutes under no agitation. After 22 minutes, the solution was stirred at 500 rpm for 1 minute, and again after 44 minutes. The resultant gel slurry was then vacuum filtered with filter cloth and 4000 cc of water. The remaining wet cake was then air purged for 30 minutes after cracking and was oven dried (105° C.). The resultant gel solids level was measured to be about 15%.

This resulting gel wet cake was reslurried and mixed with copper sulfate pentahydrate as in Inventive Example 1. The pH of the copper-doped wet gel slurry was increased to a pH of 10. The resultant slurry was then dried in an oven at 105° C., and the dried basic copper-doped gel was pulverized using a coffee grinder to a mean particle size of about 50 microns.

This dried copper-doped acid gel product was then surface treated with sulfur-functionalized silane, bis-(triethoxy-silylpropyl) tetrasulfide, using ethanol as the solvent, and dried (at 110° C.). The weight ratio of the reactants was 3.6 g silane to 10 g of dried gel. The treated sample was then heated at 140° C. for 2 hours before Hg removal testing was commenced.

Inventive Example 4

This was the same as Inventive Example 3, except that the pH level was raised to 8 instead of 10.

Inventive Example 5

900 liters of water were added to a 150 gallon reactor. 11.4% sulfuric acid was then introduced to the same reactor to adjust the pH to 4 and the solution was then heated to 90° C. The resultant aqueous solution was then dropped into a large filter feed tank. In the same 150 gallon reactor as above, 150 liters of room temperature sulfuric (11.4 wt %) acid was then added under agitation enough to stir with minimal splashing. Sodium silicate (3.3 molar ratio, 24.7 wt %) was then added thereto at room temperature in two stages. The first stage, being at a rate of 3.0 liters/min until the resultant pH was close to 2.5. Thereafter, the second stage silicate addition was run at a rate of 1.5 liters/min until a pH of about 2.85 was reached, at which time silicate addition was stopped. The pH level was then manually adjusted pH to 3.00. The resultant reactor batch was then pumped into the large filter feed tank, while maintaining the temperature at about 90° C. under no agitation for an initial period of 22 minutes, followed by 1 minute of agitation at 500 rpm, followed by a second non-agitation period of another 22 minutes, and a second 1-minute agitation at the same speed. The resultant gel slurry was then washed and filtered with a filter press (EIMCO), until the filtrate conductivity was measured below 3000 μmho. After a 10-minute air purge, the resultant gel wet cake was oven dried (105° C.) and the resultant gel solids was measured to be about 17.35%.

1000 g of the resultant wet cake was then mixed with 7.2 g of copper sulfate pentahydrate. The copper-doped wet acid gel was then dried in an oven at 105° C. The dried copper-doped acid gel was then pulverized in a coffee grinder to a mean particle size of about 50 microns.

This dried copper-doped acid gel product was then surface treated with sulfur-functionalized silane, bis-(triethoxy-silylpropyl) tetrasulfide, using ethanol as the solvent, and dried (at 110° C.). The weight ratio of the reactants was 5.5 g silane to 10 g of dried gel. The treated sample was then heated at 140° C. for 2 hours before Hg removal testing was commenced.

Comparative Example 1

The same initial silica gel production method was followed as in Inventive Example 2, above. 650 g of the resulting silica gel wet cake was mixed with 0.27 g of copper sulfate pentahydrate using a Cowles mixer. The copper doped wet acid gel was then dried in an oven at 105° C. and the dried doped gel was pulverized with a coffee grinder to a mean particle size of about 50 microns.

Inventive Example 6

1000 g of the dried copper-doped acid gel product of Comparative Example 1 was then surface treated with sulfur-functionalized silane, bis-(triethoxy-silylpropyl) tetrasulfide, using ethanol as the solvent, and dried (at 110° C.). The weight ratio of the reactants was 5.5 g to 10 g of dried gel. The treated sample was then heated at 140° C. for 2 hours before Hg removal testing was commenced.

Inventive Example 7

This example followed the same method as in Inventive Example 5 except that the surface treatment with the sulfur-functional silane was performed with a weight ratio of 9 g of the silane to 50 g of the copper-doped silica gel.

Inventive Example 8

The same initial method as in Inventive Example 5 was followed except that instead of copper doping, iron was applied. Thus, after silica gel wet cake production, 650 g of the resulting cake was mixed with 9.536 g of $FeSO_4$, using a Cowles mixer. The iron (2+) doped wet acid gel was then dried in the oven (105° C.) and the resultant dried doped gel was pulverized within a coffee grinder to a mean particle size of about 50 microns. This product was then surface treated as in Inventive Example 6 with the same sulfur-functional silane.

Inventive Example 9

The same method as in Inventive Example 3 was followed except that instead of copper doping, iron was applied. Thus, silica gel wet cake production, the wet cake was reslurried and mixed with 2.15 g of $Fe_2O_3$. The resultant slurry was then dried in an oven (105° C.) and the resultant dried iron oxide-doped gel was pulverized using a coffee grinder to a mean particle size of about 50 microns. This product was then surface treated as in Inventive Example 3 with the same sulfur-functional silane.

Comparative Example 2

1020 cc of water were introduced within a 1-gallon stainless vessel and the pH thereof was then adjusted to about 4 with $H_2SO_4$. This aqueous solution was then heated to 90° C. In a 1.5 liter reactor, 153.2 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 11.4 cc/min until the pH level was about 2.5. After 10 minutes, the RPM was raised to 250 and gradually increased to 300 over a period of several minutes. Thereafter, the second stage silicate addition began at a rate of 1.7 cc/min until pH=2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under no agitation initially. After 22 minutes, the aged reactor batch was agitated for 1 minute, as well as at the 44 minute point for 1 minute, both at 300 rpm. The resultant gel slurry was then vacuum filtered with filter cloth and 5000 cc of water and air purged for 30 minutes after the wet gel cake cracked. The cake solids were about 7.8%.

The resulting gel wet cake (500 g, 40 g dry $SiO_2$) was reslurried and mixed with 7.15 g of $Fe_2(SO_4)_3$. The resultant slurry was then dried in an oven (105° C.) and the dried iron (3+)-doped gel was pulverized using a coffee grinder to a mean particle size of about 50 microns.

Surface treatment of the dried gel was then performed doping the resultant particles with sulfur functionalized silane, bis-(triethoxy-silylpropyl) tetrasulfide, using a food processor at room temperature. The weight ratio was 3.6 g silane on 10 g of dried iron (3+)-doped gel. The silane treated dried gel was dried again for at least 4 hours in an oven at 140° C. for several hours before Hg removal testing.

Inventive Example 10

The same method as in Comparative Example 2, above, was followed with the exception that the resulting gel wet cake (500 g) was reslurried and mixed with 2.07 g of ZnO instead of an iron oxide. The weight ratio of the silane to zinc-doped gel was 10.99 g silane:30.5 g gel, as well.

Inventive Example 11

The same method was followed as in Inventive Example 10 with the exception that the weight ratio of the silane to the zinc-doped gel was 13.68 g:38 g.

Comparative Example 3

2040 cc of water were introduced within a 2-gallon stainless vessel and 3 cc of 10% NaOH was added. This aqueous solution was then heated to 90° C. In a 3 liter reactor, 306.4 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 19.4 cc/min until the pH level was about 2.5. After 10 minutes, the RPM was raised to 250 and gradually increased to 300 over a period of several minutes. Thereafter, the second stage silicate addition began at a rate of 2.2 cc/min until pH≈2.85 is reached, at which time silicate addition finished. The pH of the resultant batch was then manually adjusted to 3.00.

The resultant reactor batch was then transferred into a 2-gallon vessel containing hot water and maintained at a temperature of about 90° C. under no agitation initially. After 22 minutes, the aged reactor batch was agitated for 1 minute, as well as at the 44 minute point for 1 minute, both at 300 rpm. The resultant gel slurry was then vacuum filtered with filter cloth and 5000 cc of water and air purged for 30 minutes after the wet gel cake cracked. The cake solids is about 7.8%.

The resulting gel wet cake (862 g) was reslurried and mixed with 21.2 g of $ZnSO_4 \times 7H_2O$. The resultant slurry was then dried in an oven (105° C.), and the dried zinc (2+)-doped gel was pulverized using a coffee grinder to a mean particle size of about 50 microns.

Surface treatment of the dried gel was performed with the same silane as used in the inventive examples, above, using a food processor at room temperature. The weight ratio was 7.92 g silane on 44 g of dried zinc-doped acid gel. The silane-treated dried gel was dried again for at least 4 hours in an oven at 140° C. for several hours before Hg removal testing.

Comparative Example 4

The same method as in Comparative Example 3 was followed except that 862 g of the resulting gel wet cake was reslurried and mixed with 21.2 g of $ZnSO_4 \times 7H_2O$. Also, the dried doped gel was treated on a weight ratio basis of 15.84 g silane to 44 g of dried zinc-doped acid gel.

Comparative Example 5

Zinc oxide powder alone was used as the substrate for silane treatment in this example. Surface treatment of the ZnO powder is done doping it with sulfur functionalized silane, bis-(triethoxy-silylpropyl) tetrasulfide, using a food processor at room temperature. The weight ratio is 4.5 g silane to 50 g of dried zinc oxide powder. The silane-treated powder was dried at 140° C. for several hours before Hg removal testing.

Comparative Example 6

1020 cc of water were introduced within a 1-gallon stainless vessel and 2 cc of 10% NaOH was added. This aqueous solution was then heated to 90° C. In a 1.5 liter reactor, 153.2 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 11.4 cc/min until the pH level was about 2.5. After 10 minutes, the RPM was raised to 250 and gradually increased to 300 over a period of several minutes. Thereafter, the second stage silicate addition began at a rate of 1.7 cc/min until pH=2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under no agitation initially. After 22 minutes, the aged reactor batch was agitated for 1 minute, as well as at the 44 minute point for 1 minute, both at 300 rpm. The resultant gel slurry was then vacuum filtered with filter cloth and 5000 cc of water and air purged for 30 minutes after the wet gel cake cracked. The cake solids were about 7.8%

The resulting gel wet cake (500 g) was reslurried and mixed with 1.46 g of KBr. The resultant slurry was then dried in an oven (105° C.), and the dried bromide-doped gel was pulverized using a coffee grinder to a mean particle size of about 50 microns.

Surface treatment of the dried gel was then performed as is in for the inventive examples, above. The weight ratio was 6.7 g silane to 37 g of dried bromide-doped gel. The silane-treated dried gel was dried again for at least 4 hours in an oven and the resultant sample was heated at 140° C. for several hours before Hg removal testing.

Hg Removal from Flue Gas

To analyze mercury removal capabilities, the inventive and comparative examples were subjected to a fixed bed reactor procedure as outlined on pages 90 and 91 of Makkuni, A. et al., "Aqueous and vapor phase mercury sorption by inorganic oxide materials functionalized with thiols and poly-thiols," Clean Techn. Environ. Policy (2005) 7, 87-96 (Department of the Interior). In essence, the mercury source produced mercury vapor in sufficient amounts to be subjected to filtration via a fixed bed reactor including about 30 mg of the inventive or comparative sorbent mixed with 1 gram of sand, all supported on a glass wool bed, with a testing temperature of 140° C.

The results for such testing are outlined in the table below. The higher the total mercury absorption capacity the better the filter medium performance for mercury removal from a simulated flue gas emission system.

TABLE

Hg absorption capacities using fixed bed reactor

| Example | Inlet $Hg^0$ (ppb) | Bed mass (g) | Total Capacity µg Hg/g |
|---|---|---|---|
| Inventive 1 | 3.2 | 0.1 | 7395 |
| Inventive 2 | 78.6 | 0.0565 | 14698 |
| Inventive 3 | 2.5 | 0.1003 | 705 |
| Inventive 4 | 26.6 | 0.0227 | 257 |
| Inventive 5 | 3.2 | 0.0999 | 684 |
| Inventive 6 | 3.2 | 0.1007 | 345 |
| Inventive 7 | 14.4 | 0.0116 | 495 |
| Inventive 8 | 3.2 | 0.1005 | 75 |
| Inventive 9 | 32.2 | 0.02 | 122 |
| Inventive 10 | 26.6 | 0.0202 | 38 |
| Inventive 11 | 21.9 | 0.0146 | 111 |
| Comparative 1 | 3.2 | 0.1002 | 49 |
| Comparative 2 | 26.6 | 0.0264 | 11 |
| Comparative 3 | 26.6 | 0.0205 | 25 |
| Comparative 4 | 26.6 | 0.02 | 26 |
| Comparative 5 | 26.6 | 0.0221 | 28 |
| Comparative 6 | 20.3 | 0.0208 | 47 |
| [1]ZEOFOAM ® 166 | 3.2 | 0.1 | 17 |

[1]ZEOFOAM is a precipitated silica material available from J. M. Huber Corporation, Edison, New Jersey Thus, the inventive materials exhibit excellent high mercury absorption capacities. With an acceptable rate of at least 35 micrograms Hg/g, any such material will be acceptable as a filter medium. The surprising excessively high levels of such absorption rates, particularly for the copper-doped, acidic gels treated with sulfur-functional silanes are most preferred. In any event, the combination of metal doping with silane treatment provides excellent mercury removal results.

While the invention was described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalents thereto.

What is claimed is:

1. A filter medium comprising a metal-doped silica product including a sulfur-containing silane attached to at least the silica portions of said metal-doped silica product.

2. The filter medium of claim 1 wherein said metal is a transition metal.

3. The filter medium of claim 2 wherein said transition metal is copper.

4. The filter medium of claim 1 wherein said silica product is a silica gel.

5. The filter medium of claim 1 wherein said metal-doped silica product is acidic.

6. A multivalent metal-doped silica gel having a silane moiety present thereon with at least two sulfur groups, wherein said gel exhibits a mercury removal level of 35 microgram Hg/g upon utilization in a fixed bed filter test protocol.

7. A method of producing such metal-doped silica gel materials having a sulfur-containing silane treatment applied thereto is provided, said method comprising the sequential steps of:

a) providing a silica material selected the group consisting of a precipitated silica, a silica gel, or a combination of both;

b) wet reacting said silica material with at least one multivalent metal salt to produce metal-doped silica material;

c) drying and milling said metal-doped silica material to a desired particle size;

d) introducing an amount of sulfur-containing silane materials to the dried and milled metal-doped silica materials of step "c" to produce resultant sulfur-containing silane-treated metal-doped silica materials; and e) heating the resultant materials of step "d" at a temperature of at least 140° C. for an amount of time to effectuate a color change from the resultant materials of step "d".

8. A method for the removal of mercury vapor from a flue gas comprising the utilization of a filter medium as described in claim 1.

* * * * *